US012769306B2

(12) United States Patent
Beresford et al.

(10) Patent No.: US 12,769,306 B2
(45) Date of Patent: Oct. 20, 2026

(54) CONTROL SYSTEM AND METHOD

(71) Applicant: JAGUAR LAND ROVER LIMITED, Warwickshire (GB)

(72) Inventors: William Beresford, Warwickshire (GB); Fivos Panagiotopoulos, Warwickshire (GB); Vimalkanth Kamalakanthan, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 186 days.

(21) Appl. No.: 17/595,765

(22) PCT Filed: May 22, 2020

(86) PCT No.: PCT/EP2020/064254
§ 371 (c)(1),
(2) Date: Nov. 23, 2021

(87) PCT Pub. No.: WO2020/234441
PCT Pub. Date: Nov. 26, 2020

(65) Prior Publication Data

US 2022/0326041 A1 Oct. 13, 2022

(30) Foreign Application Priority Data

May 23, 2019 (GB) ...................................... 1907293

(51) Int. Cl.
*G05D 1/00* (2024.01)
*G01C 21/00* (2006.01)
(Continued)

(52) U.S. Cl.
CPC ....... *G05D 1/0088* (2013.01); *G01C 21/3492* (2013.01); *G01C 21/3605* (2013.01); *G01C 21/3841* (2020.08)

(58) Field of Classification Search
CPC ................ G01C 21/26; G01C 21/3841; G01C 21/3492; G01C 21/3605
See application file for complete search history.

(56) References Cited

U.S. PATENT DOCUMENTS 5,289,184 A 2/1994 Suzuki
8,965,685 B1 * 2/2015 Denaro ............. G01C 21/3697 701/410

(Continued)

FOREIGN PATENT DOCUMENTS

EP 1679488 A1 7/2006
EP 2543963 A1 1/2013

(Continued)

OTHER PUBLICATIONS

Great Britain Intellectual Property Office, Combined Search and Examination Report under Sections 17 and 18(3) Issued in Application No. GB1907293.3, Oct. 29, 2019, 7 pages.

(Continued)

*Primary Examiner* — Jason Holloway
*Assistant Examiner* — Godfrey Aleksander Maciorowski
(74) *Attorney, Agent, or Firm* — McCoy Russell LLP

(57) ABSTRACT

Aspects of the present disclosure relate to a control system for a host vehicle. The control system comprises one or more controllers. The control system is configured to associate navigation data for the host vehicle with a value indicative of a time point; determine an indication of time elapsed since the time point; and disable use of said navigation data based on the result of the determination. Aspects of the disclosure also relate to a vehicle, a control method and a non-transitory computer readable medium.

19 Claims, 6 Drawing Sheets

(51) Int. Cl.
*G01C 21/34* (2006.01)
*G01C 21/36* (2006.01)

(56) References Cited

U.S. PATENT DOCUMENTS

| | | | | |
|---|---|---|---|---|
| 2004/0174222 | A1* | 9/2004 | Rosnell | H04L 27/2057 332/144 |
| 2011/0202274 | A1* | 8/2011 | Aikawa | G01C 21/3881 707/822 |
| 2012/0047515 | A1* | 2/2012 | Kanetomo | G06F 9/4843 718/107 |
| 2014/0018995 | A1 | 1/2014 | Ferguson et al. | |
| 2018/0151066 | A1* | 5/2018 | Oba | B60W 50/082 |
| 2018/0364734 | A1* | 12/2018 | Ferguson | G05D 1/0274 |
| 2019/0019349 | A1 | 1/2019 | Dolgov et al. | |
| 2019/0130743 | A1* | 5/2019 | Dabby | G01C 21/28 |

FOREIGN PATENT DOCUMENTS

| | | | |
|---|---|---|---|
| EP | 2848891 | A1 | 3/2015 |
| EP | 3273422 | A1 | 1/2018 |
| WO | 2018135991 | A1 | 7/2018 |
| WO | 2020234441 | A1 | 11/2020 |

OTHER PUBLICATIONS

ISA European Patent Office, International Search Report and Written Opinion Issued in Application No. PCT/EP2020/064254, Nov. 9, 2020, WIPO, 16 pages.

Great Britain Intellectual Property Office, Examination Report under Section 18(3) Issued in Application No. GB1907293.3, Sep. 1, 2021, 4 pages.

* cited by examiner

CONTROL SYSTEM AND METHOD

CROSS REFERENCE TO RELATED APPLICATIONS

The present application is a U.S. National Phase of International Application No. PCT/EP2020/064254 entitled "CONTROL SYSTEM AND METHOD," and filed on May 22, 2020. International Application No. PCT/EP2020/064254 claims priority to Great Britain Patent Application No. 1907293.3 filed on May 23, 2019. The entire contents of each of the above-listed applications are hereby incorporated by reference for all purposes.

TECHNICAL FIELD

The present disclosure relates to a control system and method. Aspects of the disclosure relate to a control system, a vehicle, a control method and a non-transitory computer readable medium.

BACKGROUND AND SUMMARY

Vehicles such as cars contain control systems which can receive and use data relating to the vehicle's surroundings. For example, a vehicle may contain short-range sensors, such as ultrasonic sensors, which provide data on obstacles in close proximity to the vehicle. A vehicle control system may also receive data relating to a route to be taken by the vehicle. This data may cover attributes of the route up to several kilometres from the vehicle's current position.

Aspects and embodiments of the disclosure provide a control system for a host vehicle, a host vehicle comprising a control system, a control method and a non-transitory computer readable medium.

According to an aspect of the present disclosure, there is provided a control system for a host vehicle. The control system comprises one or more controllers, and is configured to associate navigation data for the host vehicle with a value indicative of a time point; determine an indication of time elapsed since the time point; and disable use of said navigation data based on the result of the determination. This allows the control system to monitor the age of navigation data, and control use of the navigation data accordingly.

According to a further aspect of the present disclosure, there is provided a control system for a host vehicle. The control system comprises one or more controllers, and is configured to associate data relating to an electronic horizon with a value indicative of a time point; determine an indication of time elapsed since the time point; and perform an operation relating to the electronic horizon based on the result of the determination. This allows the control system to monitor the age of an electronic horizon, and perform operations relating to the electronic horizon accordingly.

In one embodiment, the one or more controllers collectively comprise: at least one electronic processor configured to determine the indication of time elapsed; and at least one electronic memory device electrically coupled to the at least one electronic processor, the at least one electronic memory device having instructions stored therein. The control system being configured to associate navigation data for the host vehicle with a value indicative of a time point and disable use of the navigation data based on the result of the determination comprises the at least one processor being configured to access the at least one electronic memory device and execute the instructions stored therein such that it is operable to associate the navigation data with the value indicative of the time point and disable use of said navigation data based on the result of the determination.

The at least one electronic memory device may have the navigation data stored therein.

The control system may be configured to receive a query and respond to the query based on the result of the determination. This can allow the control system to respond to queries based on the age of navigation data.

The control system may be configured to respond to the query by providing a message indicating that the navigation data is not available. This can allow a function of the vehicle to be provided with information that the navigation data is not available.

The control system may be configured to disable use of the navigation data by controlling one or more functions of the vehicle to operate without using the navigation data. This can prevent functions of the vehicle from operating using navigation data after a certain time has elapsed.

The control system may be configured to disable use of the navigation data by deleting the navigation data. This can prevent functions of the vehicle from operating using navigation data after a certain time has elapsed.

Optionally, the control system may comprise a counter. The system may be configured to associate the navigation data with the value indicative of the time point by setting the counter to a predetermined value or by recording a value provided by the counter.

The counter may be configured to record the number of calls from an application, and the system may be configured to determine the indication of the time elapsed since the time point based on the number of calls recorded by the counter. This arrangement makes use of existing functionality of the vehicle to determine an indication of the time elapsed since the time point.

Optionally, the control system may comprise a clock generator configured to generate a clock signal. The counter may be configured to determine the indication of the time elapsed based on the clock signal.

The control system may be configured to receive the navigation data from an electronic horizon provider.

The time point may be the time point at which the navigation data is received by the control system.

The navigation data may comprise data relating to at least one route for the vehicle and/or data relating to the vehicle.

According to a further aspect of the present disclosure, there is provided a vehicle comprising a control system according to any of the embodiments herein.

According to a further aspect of the present disclosure, there is provided a control method comprising: associating navigation data for a host vehicle with a value indicative of a time point; determining an indication of time elapsed since the time point; and disabling use of the navigation data based on the result of the determination.

According to a further aspect of the present disclosure, there is provided a control method comprising associating navigation data relating to an electronic horizon with a value indicative of a time point; determining an indication of time elapsed since the time point; and performing an operation relating to the electronic horizon based on the result of the determination.

The method may comprise receiving a query; and responding to the query based on the result of the determination.

Responding to the query may comprise providing a message indicating that the navigation data is not available.

Disabling use of the navigation data may comprise controlling one or more functions of the vehicle to operate without using the navigation data.

Disabling use of the navigation data may comprise deleting the navigation data.

Associating the navigation data with the value indicative of the time point may comprise setting a counter to a predetermined value or recording a value provided by the counter.

The method may comprise recording the number of calls from an application, using the counter. Determining the indication of the time elapsed since the time point may comprise determining the indication of the time elapsed based on the recorded number of calls.

The method may comprise generating a clock signal. Determining the indication of the time elapsed since the time point may comprise determining the indication of the time elapsed based on the clock signal.

The method may comprise receiving the navigation data from an electronic horizon provider.

The time point may be the time point at which the navigation data is received.

According to a further aspect of the present disclosure, there is provided a controller comprising a non-transitory computer readable medium as set out above.

Within the scope of this application it is expressly intended that the various aspects, embodiments, examples and alternatives set out in the preceding paragraphs, and/or in the following description and drawings, and the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
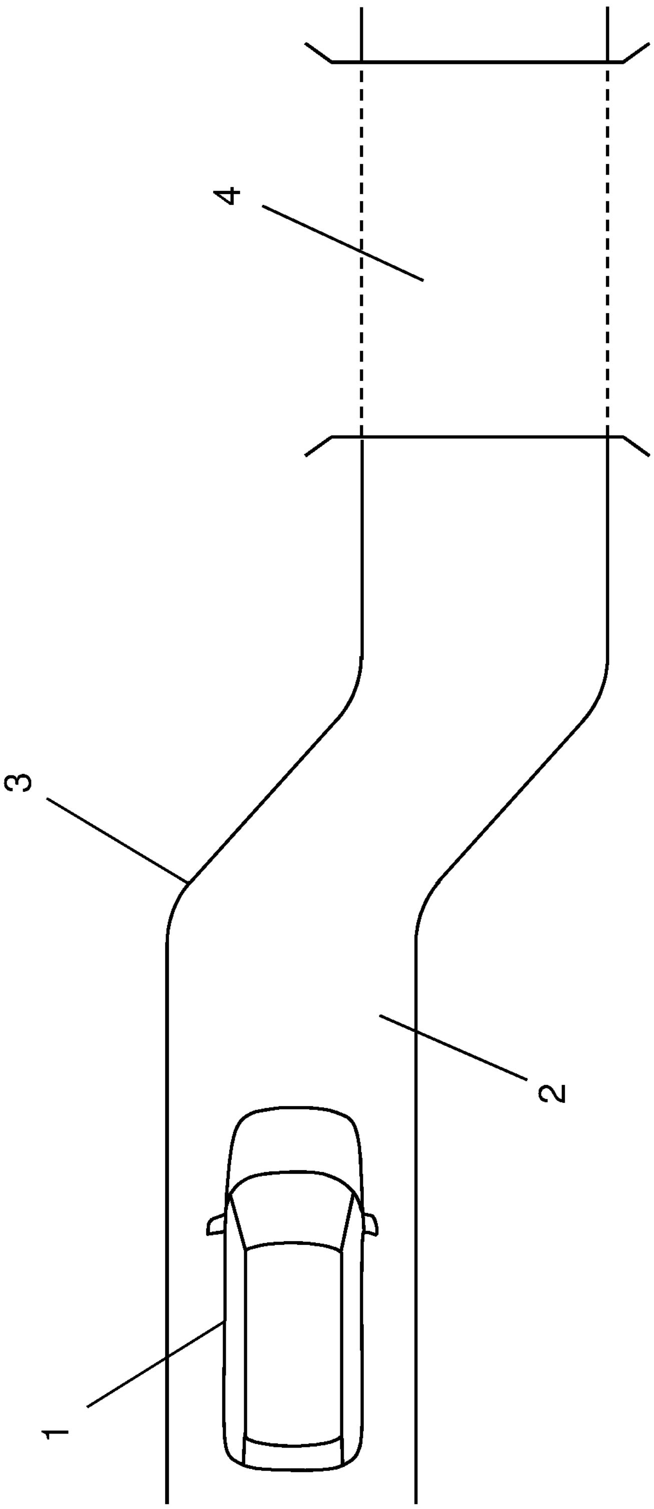
FIG. 1 is a schematic diagram illustrating a vehicle according to embodiments of the disclosure and its upcoming route.

FIG. 1 is a schematic diagram of a vehicle, in the present case a car 1, travelling along a road 2. The car 1 contains a control system according to an embodiment of the disclosure. It should be noted that a car is merely one example of a type of vehicle, and that control systems according to embodiments of the disclosure may be implemented in other types of vehicle, such as lorries or buses.

The control system of the car 1 is provided with navigation data from a provider. This will be explained in more detail below with reference to FIG. 2. The navigation data includes data about the upcoming route to be taken by the car 1 and/or data relating to the car 1 as it travels along the route. For instance, the data about the upcoming route may relate to a route for the car 1 which is programmed by the driver into a navigation system of the car 1 or which is otherwise predicted based on previous driving patterns or usual routes. The control system of the car 1 can adjust functions and/or features of the car 1 based on the navigation data.

In the present embodiment, the control system of the car 1 is provided with navigation data relating to attributes of the most probable route for the car 1, as well as alternative possible routes for the car 1. In other embodiments, the navigation data may relate to the route to be taken by the car 1 only.

In the present embodiment, the navigation data is 'short range' data which relates to attributes of the most probable route up to 2.5 kilometres ahead of the current position of the car 1 and attributes of alternative possible routes up to 200 m from the most probable route. In general, the 'short range' data may relate to attributes of the most probable route at any distance from the current position of the car 1 up to 8 kilometres ahead of the current position of the car 1.

In other embodiments, the navigation data may be 'long range' data which relates to attributes of the complete upcoming route for the car 1, ending at the final destination of the car 1.

The data relating to the route to be taken by the car 1 may contain attributes of the upcoming route such as the curvature of a bend 3 in the road 2, and a position of a tunnel 4 along the route. Other examples of attributes of the upcoming route are road type, speed limits, traffic signs and the slope of the road 2.

The control system of the car 1 may control functions of the car 1 such as steering, engine, air conditioning, braking, headlights etc. based on the data relating to the route to be taken by the car 1. For example, the control system of the car 1 may control the air conditioning system to reduce the amount of air conditioning while the car 1 is in the tunnel 4. The control system may accelerate/decelerate the car 1 based on a curve's radius and/or road speed limit, or adapt the headlights based on the topology of the road 2.

Alternatively and/or in addition, the control system of the car 1 may control features of the car 1 such as country road assist, traffic jam pilot, traffic sign recognition, predictive energy optimisation, auto high beam and driver condition response based on the data relating to the route to be taken by the car 1. The control system of the car 1 may control features of the car 1 such as predictive energy optimisation and diesel particulate filter regeneration (in the case of a car 1 having a diesel engine).

Figure 2:
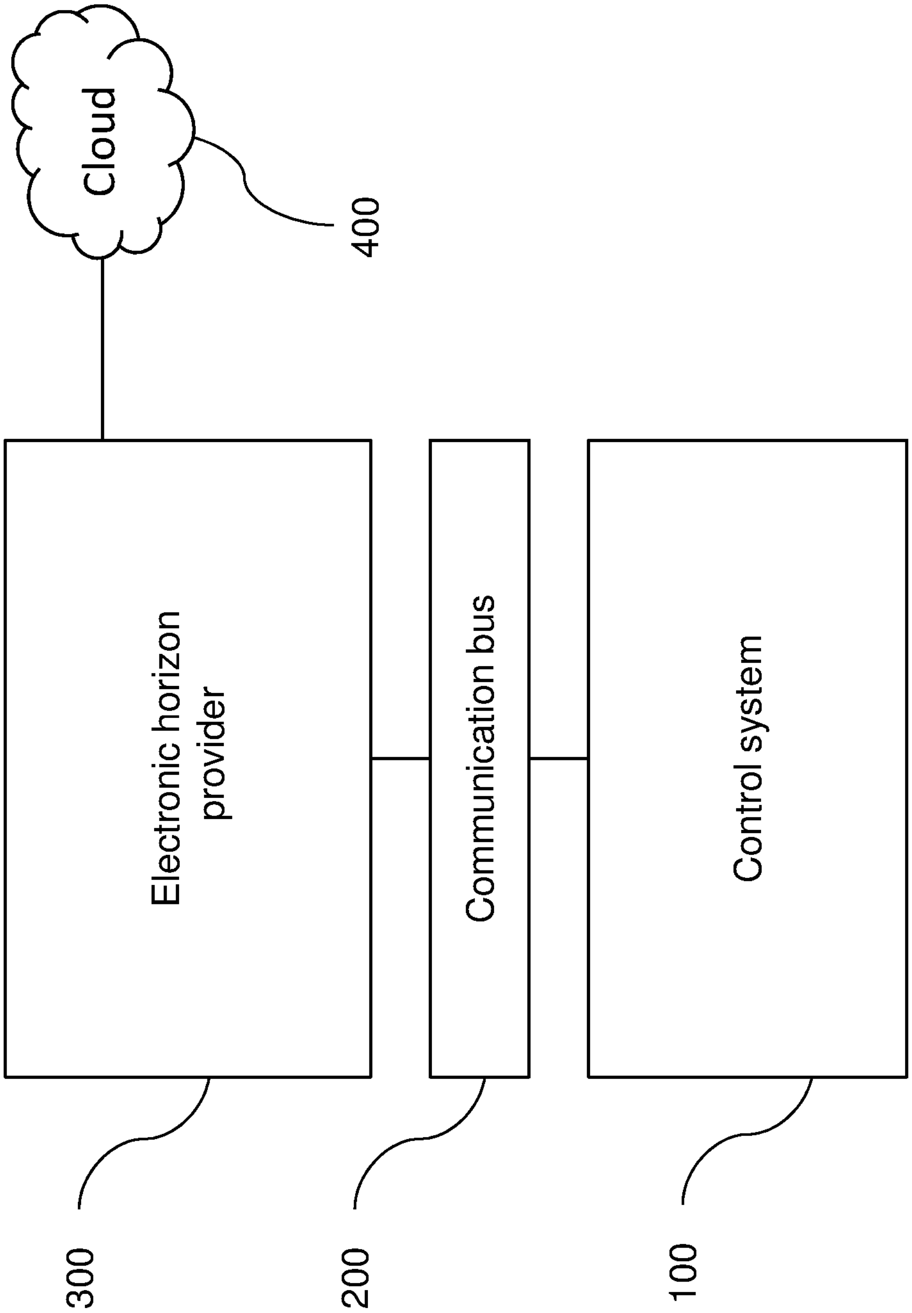
FIG. 2 is a block diagram of vehicle systems including a control system according to an embodiment of the disclosure.

FIG. 2 is a block diagram showing vehicle systems including a control system according to an embodiment of the disclosure.

As shown in FIG. 2, the vehicle systems include a control system 100 and an electronic horizon provider 300, which are connected via a communication bus 200. The communication bus 200 may be any communication bus which is known in the art, such as a controller area network (CAN) bus.

In the present embodiment, the electronic horizon provider 300 receives data regarding the current position of the vehicle from both a global positioning service (GPS) module (not shown) and vehicle trajectory sensors (not shown). Examples of the vehicle trajectory sensors include an inertial measurement unit and wheel speed sensors. Alternatively, the electronic horizon provider 300 may receive data regarding the current position of the vehicle from a GPS module only (i.e. without receiving data from vehicle trajectory sensors). In other embodiments, data regarding the current position of the vehicle can also be provided by other means; for example, using exterior sensors to detect attributes that can localise the vehicle onto a map, or using visual odometry.

The GPS module may be implemented in the electronic horizon provider 300. Alternatively, the GPS module may be a module which is disposed separately from the electronic horizon provider 300. The electronic horizon provider 300 also receives map updates from the cloud 400.

Although not shown in FIG. 2, the electronic horizon provider 300 may include modules such as a most probable path calculator, a short range horizon generator and a long range horizon generator. The electronic horizon provider 300 is configured to generate and encode a short range electronic horizon and/or a long range electronic horizon. In the present case, electronic horizon data is encoded according to the ADASIS v2 protocol. The electronic horizon provider 300 then transmits the generated electronic horizon data to the control system 100 via the communication bus 200.

Two embodiments of the control system will now be described with reference to FIGS. 3 and 4 respectively.

Figure 3:
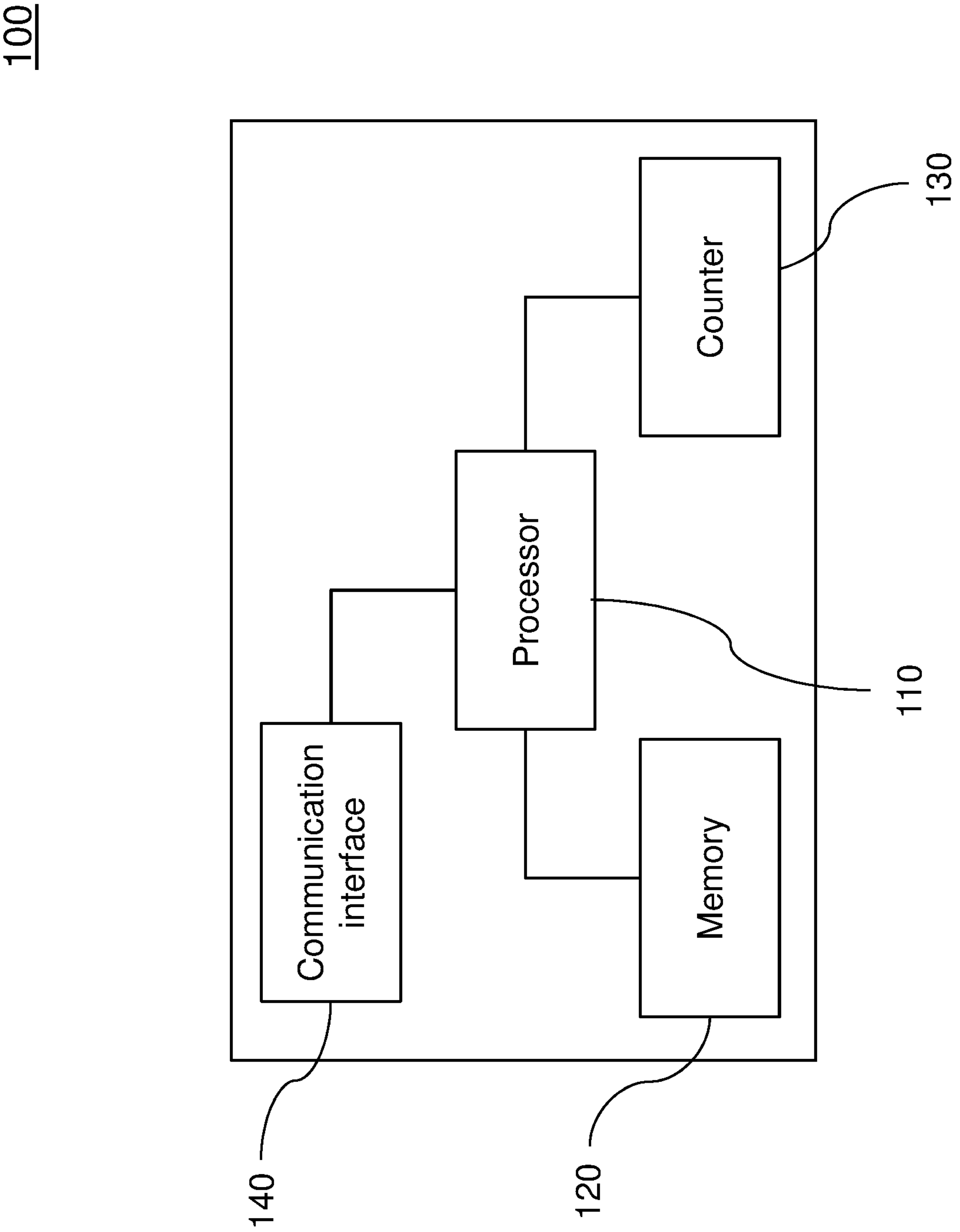
FIG. 3 is a block diagram of a control system according to an embodiment of the disclosure.

FIG. 3 is a block diagram of a control system according to an embodiment of the disclosure.

The control system 100 comprises a processor 110, a memory 120, a counter 130 and a communication interface 140. The control system 100 is embedded in a vehicle (not shown), such as the car described above in relation to FIG. 1. Although in FIG. 1 the control system 100 is illustrated as a single unit, this is not limiting, and the components of the control system 100 may be distributed throughout the vehicle.

The communication interface 140 is configured to receive data (e.g. the navigation data). The control system 100 may receive the navigation data at regular intervals via the communication interface 140.

In the present embodiment, the communication interface 140 is configured to receive the navigation data from an electronic horizon provider (not shown). The navigation data is encoded by the electronic horizon provider according to the ADASIS v2 protocol. Upon receiving the navigation data from the communication interface 140, the processor 110 decodes the navigation data and stores the navigation data in the memory 120.

The navigation data may include a message, such as an electronic horizon data message, relating to the vehicle. For example, the message may include information regarding the current position of the vehicle, the current speed of the vehicle or the current direction of the vehicle. Alternatively or in addition, the navigation data may include a message about attributes of the most probable route for the vehicle, and attributes of additional alternative routes (if any).

The functions of the vehicle may use the navigation data received by the control system 100, as discussed above in relation to FIG. 1. If the electronic horizon provider stops transmitting the navigation data for any reason, functions of the vehicle will continue to use the navigation data which was most recently received by the control system 100. This is undesirable, as the functions will not be aware that the electronic horizon provider has stopped sending new messages, and so will treat the navigation data as being valid and use the navigation data in their internal processes.

The processor 110 disables use of the navigation data after a predetermined time has elapsed. In the present case, the processor disables use of the navigation data after 3 s have elapsed. It should be understood that the present disclosure is not limited to this particular predetermined time, and the processor 110 may disable use of the navigation data after a different amount of time has elapsed. For example, the predetermined time may be any time in the range 0.1 s to 10 s, or in the range 0.5 s to 5 s.

The processor 110 records the time point at which it determines the navigation data as being successfully received. The processor 110 then associates the navigation data with a value which is indicative of this time point. This is done using the counter 130, as set out in more detail below. In the present embodiment, the counter 130 is shown as being a discrete unit separate from the processor 110. In other embodiments, the function of the counter 130 may be performed by the processor 110.

In the present embodiment, the processor 110 associates the navigation data with a value indicative of the time point by setting the counter 130 to a predetermined value, in the present case zero. In this case, the counter 130 records the number of calls from an application, starting from zero. Alternatively, the processor 110 may set the counter 130 to a non-zero value, e.g. 30. In this case, the counter 130 counts down from 30 to zero, based on the number of calls received from the application.

The application may be an application running in the control system 100, or may be an external application running in another system of the vehicle. The application issues calls at fixed intervals, and these calls are received by the counter 130. For example, the application may issue calls at 100 ms intervals. In this case, the processor 110 determines that 3 s have elapsed since the time point after the counter 130 has recorded 30 such calls. It should be understood that the present disclosure is not limited to this number of calls, and other numbers of calls may be used to determine that a particular time has elapsed.

In other embodiments, the processor 110 may associate the navigation data with a value indicative of the time point by recording an initial value provided by the counter 130. In this case, the counter 130 records the number of calls from the application starting from this initial value.

Once the processor 110 determines that 3 s have elapsed since the time point, the processor 110 disables use of the navigation data by deleting the navigation data from the memory 120. Thus, the functions of the vehicle are no longer able to use the navigation data.

Alternatively or in addition, the processor 110 may disable use of the navigation data by issuing control signals to functions of the vehicle to prevent the functions from using the navigation data. For example, the control system 100 may issue a control signal to the air conditioning system of the vehicle to instruct the air conditioning system not to use the navigation data.

In the present embodiment, the control system 100 is configured to receive queries from functions of the vehicle. For example, the control system 100 may receive a query regarding the navigation data, and responds to the query based on the time elapsed since the navigation data was received. If the predetermined time has elapsed since the most recent navigation data was received, the control system 100 may respond to the query by providing a message indicating that the navigation data is not available. In this way, the function may be provided with information that the navigation data is out of date, and can shift to a fallback strategy for when no navigation data is present.

In some arrangements, the control system 100 may additionally include a GPS unit (not shown). In such arrangements, the control system 100 may receive information regarding the vehicle such as the current position, current speed etc. of the vehicle from the GPS unit. Even if it is determined that the navigation data received from the electronic horizon provider is out of date, the control system can continue to make use of the data relating to the route to be taken by the vehicle by using the position of the vehicle obtained from the GPS unit.

Figure 4:
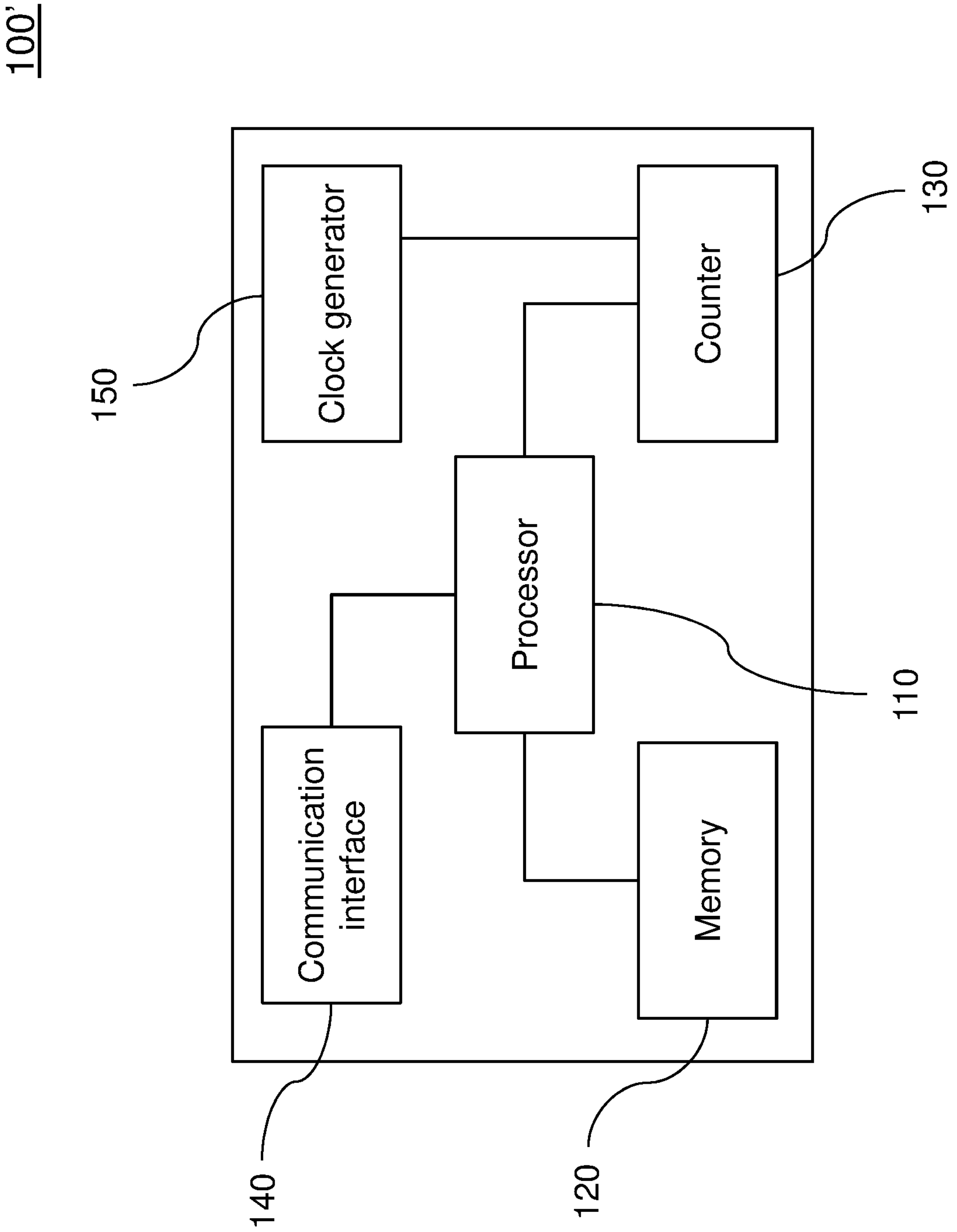
FIG. 4 is a block diagram of a control system including a clock generator according to an embodiment of the disclosure.

FIG. 4 is a block diagram of a control system 100' according to another embodiment of the disclosure. The control system illustrated in FIG. 4 is similar to the control system discussed above in relation to FIG. 3, with the addition of a clock generator 150.

The clock generator 150 is configured to generate a clock signal. For example, the clock generator 150 may include a resonant circuit, such as a quartz piezo-electric oscillator, which generates a square wave clock signal with a fixed frequency.

In the present embodiment, the clock generator 150 is a real-time clock which provides a system time signal in hour/minute/second format e.g. 15:03:00. For example, the processor 110 may record the time point 15:03:00 as a time at which it determines the navigation data as being successfully received. The counter 130 can then use the system time signal to count 3 seconds from this time. In the present case, the processor 110 determines that 3 s have elapsed after the counter 130 reaches a time value of 15:03:03.

In other embodiments, the clock generator 150 may provide a relative time signal, e.g. ticks at 0.0001 ms intervals. In this case, the counter 130 counts the number of ticks after it has been set to a given value by the processor 110. In this case, the processor 110 determines that 3 s have elapsed after $3\times10^7$ ticks have been counted by the counter 130.

Alternatively, the counter 130 may count the number of calls from an application so that the processor 110 can determine the indication of the time elapsed, as described above in relation to FIG. 3.

Figure 5:
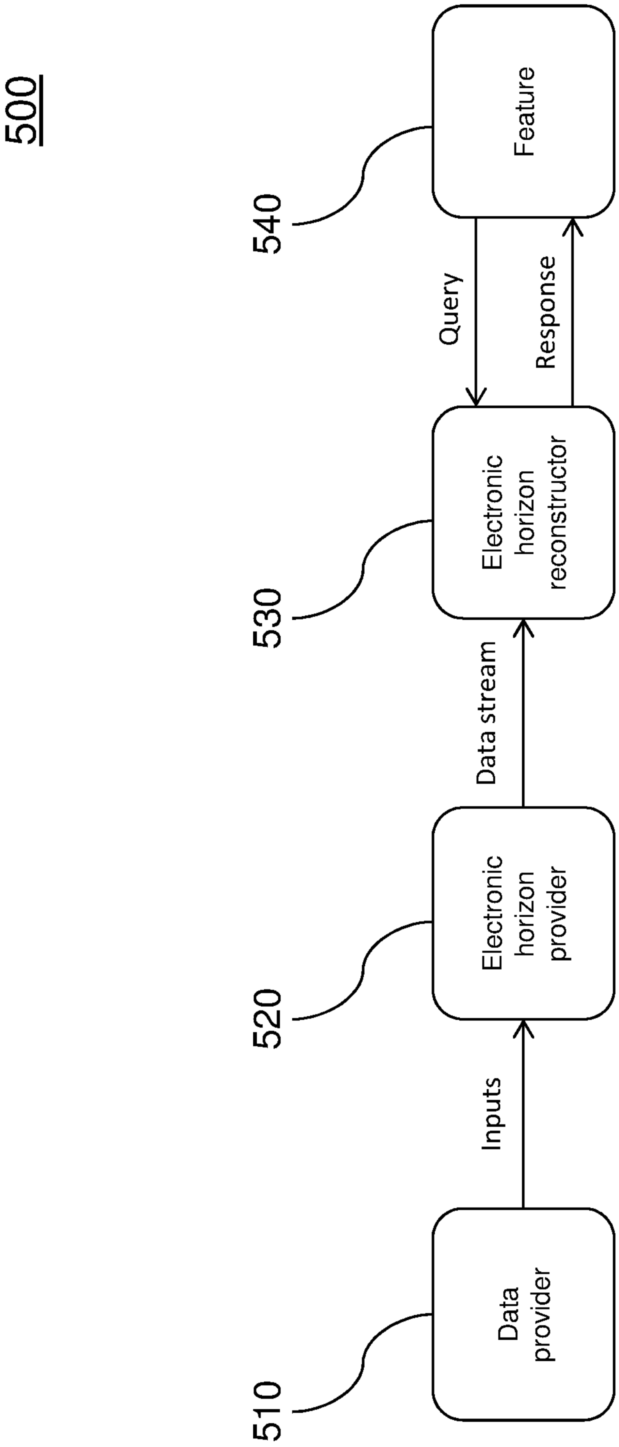
FIG. 5 is a schematic flow diagram illustrating the processes carried out by an electronic horizon system according to an embodiment of the present disclosure.

FIG. 5 is a schematic flow diagram illustrating the processes carried out by an electronic horizon system according to an embodiment of the present disclosure.

The electronic horizon system 500 includes a data provider 510, an electronic horizon provider 520, an electronic horizon reconstructor 530 and a feature 540. The electronic horizon system 500 may be implemented in a vehicle, such as a car described above in relation to FIG. 1. The electronic horizon reconstructor 530 may be implemented in any one of the control systems described herein.

The data provider 510 transmits data to the electronic horizon provider 520, which processes the data to generate electronic horizon data. The electronic horizon provider 520 then transmits the electronic horizon data to the electronic horizon reconstructor 530 in the form of a data stream. In the present case, the electronic horizon data is encoded using the ADASIS v2 protocol, and includes an ADASIS v2 position message.

The electronic horizon reconstructor 530 decodes and stores the data stream from the electronic horizon provider 520 to allow an interface to be available to the feature 540. The electronic horizon reconstructor 530 can respond to a query received from the feature 540 based on the stored electronic horizon data.

Loss of functionality in the input to the electronic horizon provider 520 or in the data stream to the electronic horizon reconstructor 530 may lead to the electronic horizon reconstructor 530 being provided with unusable data. The electronic horizon reconstructor 530 monitors the age of the most recent ADASIS v2 position message received from the electronic horizon provider 520, and will delete the stored electronic horizon data after a predetermined amount of time passes without receiving a new position message. The electronic horizon reconstructor 530 can respond to queries received after the data has been deleted with an error message informing the feature 540 that no data is available.

Figure 6:
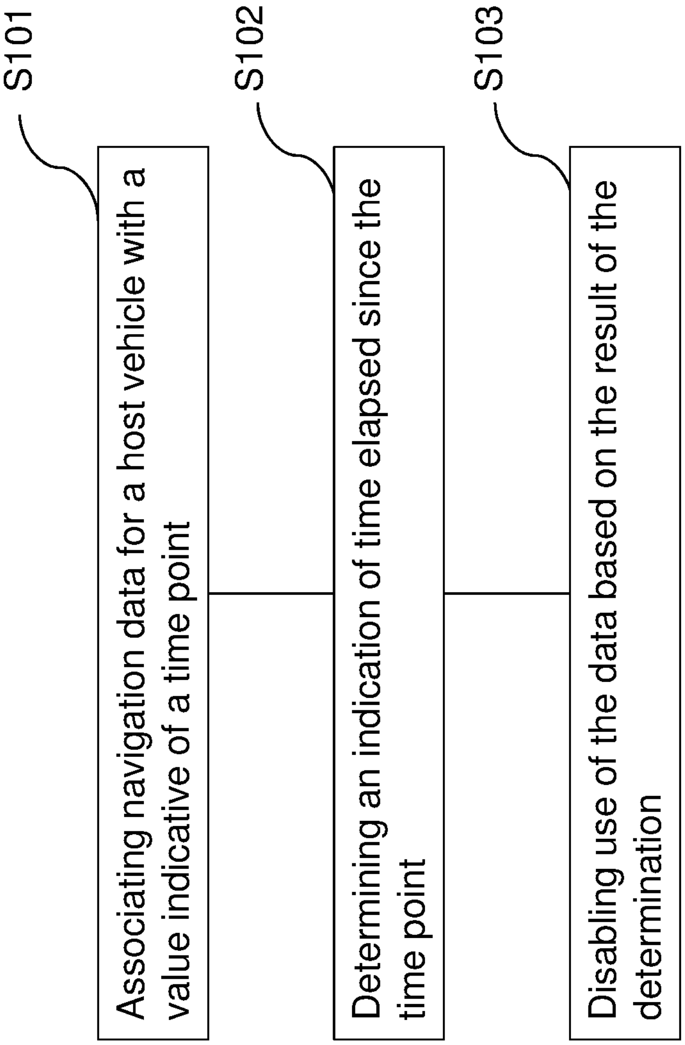
FIG. 6 is a flow chart illustrating a method according to an embodiment of the disclosure.

A control method is described herein with reference to FIG. 6. In the present embodiment, the control method comprises: associating navigation data for a host vehicle with a value indicative of a time point (S101); determining an indication of time elapsed since the time point (S102); and disabling use of the navigation data based on the result of the determination (S103).

In accordance with an embodiment of the present disclosure, there is provided a non-transitory computer readable medium storing computer readable instructions that, when executed by a processor, cause performance of one or more of the methods described above. Examples of such a computer readable medium include a magnetic storage medium such as a hard drive, an optical storage medium such as a compact disc, or a solid state storage medium such as a solid state drive.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

It will be appreciated that various changes and modifications can be made to the present disclosure without departing from the scope of the present application.

The invention claimed is:

1. A vehicle, comprising:

an electronic horizon provider configured to generate navigation data, the navigation data comprising electronic horizon data defining an electronic horizon with respect to a position of the vehicle at a time that the navigation data is generated; and a control system for the vehicle, the control system comprising one or more controllers, the control system configured to:

receive the navigation data from the electronic horizon provider and save the navigation data in memory of the control system when the navigation data is received;

associate the navigation data for the vehicle with a value indicative of a time point at which the navigation data is received by the control system;

determine an indication of time elapsed since the time point; and disable use of said navigation data based on a result of the determination and further based on no new navigation data being received from the electronic horizon provider, wherein the control system is configured to disable use of the navigation data by controlling one or more functions of the vehicle to operate without using the navigation data and by deleting the navigation data from the memory.

2. The vehicle of claim 1, wherein the one or more controllers collectively comprise:

at least one electronic processor configured to determine the indication of time elapsed; and at least one electronic memory device electrically coupled to the at least one electronic processor, the at least one electronic memory device having instructions stored therein, wherein the control system being configured to associate said navigation data with said value indicative of said time point and disable use of said navigation data based on the result of the determination comprises the at least one electronic processor being configured to access the at least one electronic memory device and execute the instructions stored therein such that it is operable to associate the navigation data with the value indicative of the time point and disable use of said navigation data based on the result of the determination.

3. The vehicle of claim 2, wherein the at least one electronic memory device has the navigation data stored therein.

4. The vehicle of claim 1, wherein the control system is configured to:

receive a query; and respond to the query based on the result of the determination.

5. The vehicle of claim 4, wherein the control system is configured to respond to the query by providing a message indicating that the navigation data is not available.

6. The vehicle of claim 1, wherein disabling use of said navigation data based on the result of the determination and further based on no new navigation data being received comprises disabling use of said navigation data responsive to determining that the time elapsed since the time point with no new navigation data being received is greater than a threshold.

7. The vehicle of claim 6, wherein the threshold is in a range of 0.1 to 10 seconds.

8. The vehicle of claim 1, wherein the control system comprises a counter, and wherein the control system is configured to associate the navigation data with the value indicative of the time point by setting the counter to a predetermined value or by recording a value provided by the counter.

9. The vehicle of claim 8, wherein the counter is configured to record a number of calls from an application, and the control system is configured to determine the indication of the time elapsed since the time point based on the number of calls recorded by the counter.

10. The vehicle of claim 1, wherein the control system comprises a clock generator configured to generate a clock signal, and wherein the control system is configured to determine the indication of the time elapsed based on the clock signal.

11. The vehicle of claim 1, wherein the navigation data comprises data relating to at least one route for the vehicle and/or data relating to the vehicle.

12. A control method for a vehicle, the control method comprising:

generating navigation data for the vehicle using an electronic horizon provider hosted within the vehicle, the navigation data comprising electronic horizon data defining an electronic horizon with respect to a position of the vehicle at a time that the navigation data is generated;

transmitting the navigation data to a vehicle control system of the vehicle;

associating the navigation data for the vehicle with a value indicative of a time point at which the navigation data is received by the control system;

storing the navigation data and the value indicative of the time point in memory;

controlling one or more functions of the vehicle based on the navigation data;

determining that an amount of time elapsed without receiving new navigation data since the time point has reached a threshold; and disabling use of said navigation data in response to the determination and based on no new navigation data being generated using the electronic horizon provider, wherein disabling use of said navigation data comprises deleting the navigation data from the memory.

13. A non-transitory computer readable medium comprising computer readable instructions that, when executed by a processor, cause performance of the control method of claim 12.

14. The control method of claim 12, further comprising:

receiving a query; and responding to the query based on the result of the determination.

15. The control method of claim 14, wherein responding to the query comprises providing a message indicating that the navigation data is not available.

16. The control method of claim 12, wherein disabling use of said navigation data comprises controlling the one or more functions of the vehicle to operate without using the navigation data.

17. The control method of claim 12, wherein associating the navigation data with the value indicative of the time point comprises setting a counter to a predetermined value or recording a value provided by the counter.

18. The control method of claim 17, further comprising recording a number of calls from an application, using the counter, wherein determining the indication of the time elapsed since the time point comprises determining the indication of the time elapsed based on the recorded number of calls.

19. The control method of claim 12, further comprising generating a clock signal, wherein determining the indication of the time elapsed since the time point comprises determining the indication of the time elapsed based on the clock signal.

* * * * *